(12) United States Patent
Higgins et al.

(10) Patent No.: US 8,554,138 B2
(45) Date of Patent: Oct. 8, 2013

(54) METHOD AND APPARATUS FOR PRIORITY SIGNALING OVER A WIRELESS SERIAL COMMUNICATION CHANNEL

(75) Inventors: Robert J. Higgins, Plantation, FL (US); John B. Preston, Plantation, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 345 days.

(21) Appl. No.: 12/538,505

(22) Filed: Aug. 10, 2009

(65) Prior Publication Data

US 2011/0034126 A1 Feb. 10, 2011

(51) Int. Cl.
*H04B 7/00* (2006.01)

(52) U.S. Cl.
USPC ........................................................ 455/41.2

(58) Field of Classification Search
USPC ........................................................ 455/41.2
See application file for complete search history.

(56) References Cited

U.S. PATENT DOCUMENTS

| | | | |
|---|---|---|---|
| 7,058,042 B2 | 6/2006 | Bontempi | |
| 7,408,948 B2 | 8/2008 | Lopponen | |
| 7,940,775 B2 | 5/2011 | Guo et al. | |
| 8,346,170 B2* | 1/2013 | Preston et al. | 455/41.2 |
| 8,417,186 B2* | 4/2013 | Preston et al. | 455/41.2 |
| 2003/0228863 A1* | 12/2003 | Vander Veen et al. | 455/412.1 |
| 2004/0120474 A1 | 6/2004 | Lopponen | |
| 2004/0198425 A1 | 10/2004 | Mellone | |
| 2004/0199630 A1 | 10/2004 | Sarkissian | |
| 2008/0003999 A1 | 1/2008 | Sung | |
| 2008/0081667 A1* | 4/2008 | Parikh et al. | 455/558 |
| 2008/0125042 A1* | 5/2008 | Kim | 455/41.2 |
| 2009/0147780 A1 | 6/2009 | Guo et al. | |
| 2010/0274656 A1 | 10/2010 | Genschel et al. | |
| 2011/0034126 A1 | 2/2011 | Higgins et al. | |

FOREIGN PATENT DOCUMENTS

| | | |
|---|---|---|
| EP | 1928161 A1 | 6/2008 |
| WO | WO04002071 A1 | 12/2003 |
| WO | 2007067869 A2 | 6/2007 |

OTHER PUBLICATIONS

PCT/US2010/044629—International Search Report with Written Opinion mailed Nov. 11, 2010—15 pages.
"Specification of the Bluetooth System; Profiles, version 1.1; Part K:6 : Headset Profile"; XP002277008—Feb. 22, 2001—pp. 197-226.
"Specification of the Bluetooth System; Profiles, version 2; Part K:5 : Serial Port Profile"; XP002206799—Dec. 1, 1999—pp. 165-188.

(Continued)

*Primary Examiner* — Fayyaz Alam
*Assistant Examiner* — David Bilodeau
(74) *Attorney, Agent, or Firm* — Barbara R. Doutre

(57) ABSTRACT

A communication device performs a method for establishing a fast path for signaling priority data. The method includes: establishing a first short range wireless data path to a second communication device for exchanging non-priority data; and establishes a second autonomous short range wireless data path to the second communication device, for exchanging priority data, wherein the second short range wireless data path comprises a wireless serial communication channel such as a radio frequency communication Bluetooth (RFCOMM) channel. An application layer in an upper layer stack of the communication device establishes both the first and the second short range wireless data paths. Non-priority data communicated to the second communication device along the first short range wireless data path is processed by the application layer. However, priority data communicated to the second communication device along the second short range wireless data path bypasses the application layer.

23 Claims, 7 Drawing Sheets

(56) References Cited

OTHER PUBLICATIONS

Flittner, Peter, IEEE P1451.5 Wireless Sensor Interface Working Group Bluetooth Subgroup Proposal; Cambridge, United Kingdom.
"The Layered Approach: The OSI Model" Data and Computer Communications, Jan. 1, 1991, pp. 446-456.
Non Final Office Action mailed Dec. 23, 2011 in related U.S. Appl. No. 12/538,505, John B Preston, filed Aug. 10, 2009.
Notice of Allowance mailed Feb. 6, 2012 in related U.S. Appl. No. 12/538,505, John B Preston, filed Aug. 10, 2009.
International Preliminary Report on Patentability for related International Application No. PCT/US2010/044628 mailed on Feb. 23, 2012.
International Preliminary Report on Patentability for International Application No. PCT/US2010/044629 mailed on Feb. 23, 2012.
International Search Report and Written Opinion for related International Application No. PCT/US2010/044628 mailed on Jan. 25, 2011.

* cited by examiner

| HEADER BYTE #1 |
|---|
| B7 | PTT STATE 1==PRESS 0==RELEASE |
| B6 | BYTE TYPE =1 (1 == HEADER) |
| B5 | RESERVED |
| B4 | RESERVED |
| B3 | LENGTH 1A (UPPER NIBBLE OF LENGTH) |
| B2 | |
| B1 | |
| B0 | |

| HEADER BYTE #2 |
|---|
| B7 | PTT STATE 1==PRESS 0==RELEASE |
| B6 | BYTE TYPE =1 (1 == HEADER) |
| B5 | RESERVED |
| B4 | RESERVED |
| B3 | LENGTH 1B (LOWER NIBBLE OF LENGTH) |
| B2 | |
| B1 | |
| B0 | |

| DATA BYTE #1 (A) |
|---|
| B7 | PTT STATE 1==PRESS 0==RELEASE |
| B6 | BYTE TYPE =0 (0 == DATA) |
| B5 | RESERVED |
| B4 | RESERVED |
| B3 | NIBBLE OF THE DATA (UPPER IF EVEN, LOWER IF ODD) |
| B2 | |
| B1 | |
| B0 | |

| DATA BYTE #2 (B) |
|---|
| B7 | PTT STATE 1==PRESS 0==RELEASE |
| B6 | BYTE TYPE =0 (0 == DATA) |
| B5 | RESERVED |
| B4 | RESERVED |
| B3 | NIBBLE OF THE DATA (UPPER IF EVEN, LOWER IF ODD) |
| B2 | |
| B1 | |
| B0 | |

*FIG. 5*

|  | FIRST BYTE (6 BITS) | SECOND BYTE (6 BITS) |
| --- | --- | --- |
| BUTTONS | BUTTON'S KEYCODE (EMER, MFB, ON/OFF, VOL) | THE BUTTON'S STATE (ON/OFF/LONG) |
| INDICATORS (LEDS) | INDICATOR CODE | STATE (ON/OFF/BLINKING, OTHER) |
| BATTERY | BATTERY CODES (LEVEL, ERROR) | CHARGE LEVEL/ERROR/ NOT-AVAIL |
| AUDIO | AUDIO CODES (PLAYING, VOL) | PLAYING/NOT-PLAYING, VOL-LEVEL |

*FIG. 6*

| BIT POSITION | NULL PACKET (USED TO SHOW PTT STATE WHEN IT NEEDS TO BE SENT AND THERE ARE NO OTHER PACKETS TO SEND) |
| --- | --- |
| B7 | PTT STATE = 0/1 |
| B6 | 1 |
| B5 - B0 | 0 (LENGTH IS NULL THAT IS WHY THIS IS THE NULL PACKET!) |

*FIG. 7*

| BIT POSITION | HEADER | PROTOCOL (THIS ALWAYS FOLLOWS THE HEADER) | BUTTON CODE | BUTTON STATE | BATTERY CODE | BATTERY VALUE |
|---|---|---|---|---|---|---|
| B7 | PTT STATE = 0/1 | PTT STATE = 0/1 | PTT STATE = 0/1 | PTT STATE = 0/1 | PTT STATE = 0/1 | PTT STATE = 0/1 |
| B6 | 1 | 0 | 0 | 0 | 0 | 0 |
| B5 - B0 | LENGTH= LENGTH OF PACKET -1 (EG DOES NOT INCLUDE HEADER LENGTH) | PID=MCBT-PROTOCOL (==1) | CODE=MFB | 1== PRESSED | BATTERY LEVEL | 45 |

FIG. 8

METHOD AND APPARATUS FOR PRIORITY SIGNALING OVER A WIRELESS SERIAL COMMUNICATION CHANNEL

CROSS-REFERENCE TO RELATED APPLICATIONS

The present application is related to the following U.S. application commonly owned together with this application by Motorola, Inc.:

Ser. No. 12/538,458, filed Aug. 10, 2009, titled "Methods and Apparatus for Communicating a Push-to-talk State to a Communication Device" Preston, et al.

TECHNICAL FIELD

The technical field relates generally to communication devices coupled over a short range wireless link and more particularly to faster signaling of priority data over the short range wireless link.

BACKGROUND

In some communication scenarios, a communication device such as a two-way radio may be wirelessly coupled via a short range wireless link (such as a Bluetooth link) to a peripheral device that has buttons, indicators, and other features such as a push-to-talk button (PTT) for activating a PTT feature on the radio. In such a case, the button states, indicator states, and the PTT state for the radio are sent wirelessly between the two devices using the short range wireless link. Some customers, such as public safety customers, desire a very small latency period between a user pressing the PTT button on the peripheral device and a corresponding PTT command (e.g., PTT PRESS or PTT RELEASE) reaching the radio core, which cannot be realized in known systems. Low latency can be extremely important for a PTT PRESS, for example, because a latency that is too long can result in truncated voice if the user begins to speak but the radio has not been activated via the PTT PRESS to enable transmission of all of the user's initial voice messages; this is could mean the difference between a user saying "don't shoot", and having "shoot" come out in the transmitted message.

In known systems, much of the latency is caused at the peripheral device. For instance, there may be "blockage" at the peripheral that prevents the PTT state from being sent immediately, such as when the peripheral has already begun sending a message or has a buffered data stream when the PTT button is pressed. In this case, the PTT indication must wait to be sent until the other message has been sent and/or the buffer cleared; or the peripheral would have to otherwise abandon the currently transmitting and/or buffered data in some crude way. Additional overhead at the higher layers of the peripheral can further increase the latency of the PTT state transmission. For example, a Bluetooth chipset with a Virtual Machine (VM) in a headset or a small PTT device has so much overhead at the higher layers that the latency from the time the PTT button is pressed on the peripheral to the time the PTT message is received at the Bluetooth controller of the radio can be on the order of 100-400 ms; Bluetooth chipsets with no VM can still incur a latency around 70-120 ms. A wireless adapter at the radio side also adds to the latency of the PTT state reaching the radio core due to the decoding process within the higher layers of the radio side wireless adapter software stack, especially if the radio side wireless adapter manages multiple Bluetooth profiles for multiple peripherals coupled to the radio, which increases the processor load needed to manage the various corresponding data messages and route them to the proper destinations.

Thus, there exists a need for a mechanism for reducing the latency in communicating high priority data, such as a PTT state, from a peripheral device to a wirelessly coupled communication device.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 5 is a table that illustrates a nibbler protocol format in accordance with some embodiments.

FIG. 6 is a table that illustrates example headset protocol states in accordance with some embodiments.

FIG. 7 is a table that illustrates an example null message in accordance with some embodiments.

FIG. 8 is a table that illustrates example messages with buttons and battery states in accordance with some embodiments.

DETAILED DESCRIPTION

Generally speaking, pursuant to the various embodiments, a communication device performs a method for establishing a fast path for signaling priority data. The method includes: establishing a first short range wireless data path to a second communication device for exchanging non-priority data; and establishes a second autonomous short range wireless data path to the second communication device, for exchanging priority data, wherein the second short range wireless data path comprises a wireless serial communication channel such as a radio frequency communication Bluetooth (RFCOMM) channel. An application layer in an upper layer stack of the communication device establishes both the first and the second short range wireless data paths. Non-priority data communicated to the second communication device along the first short range wireless data path is processed by the application layer. However, priority data communicated to the second communication device along the second short range wireless data path bypasses the application layer, which has been shown to reduce latency to an average of about 50 ms. Those skilled in the art will realize that the above recognized advantages and other advantages described herein are merely illustrative and are not meant to be a complete rendering of all of the advantages of the various embodiments.

Figure 1:
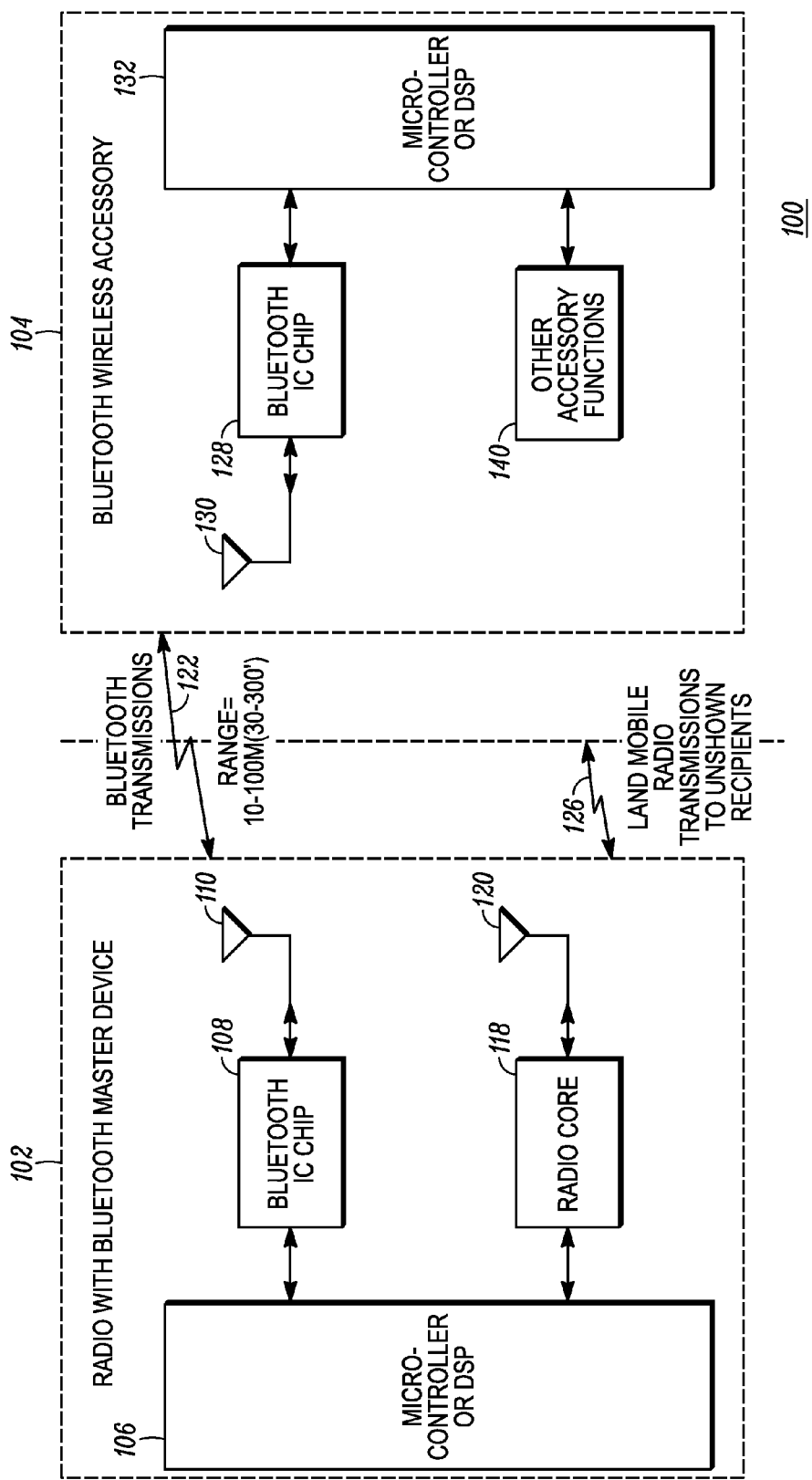
FIG. 1 is a block diagram illustrating a system that includes a communication device and peripheral, which implement methods in accordance with some embodiments.

Referring now to the drawings, and in particular FIG. 1, a block diagram illustrating a system that includes two devices that communicate priority data, such as PTT state and squelch state, in accordance with some embodiments is shown and indicated generally at 100. System 100 includes a first communication device 102 (in this case a radio with a Bluetooth wireless "master" device, which is also simply referred to herein as a radio) and a second communication device 104 (in this case a Bluetooth wireless accessory "slave" device also referred to herein as a peripheral device). The master device receives PTT commands from the slave device, wherein the master and slave devices can each be any type of wireless communication device that operates over one or more short range wireless links and that include a PTT feature. Moreover, the device 102 is equipped with apparatus for transmitting and receiving media such as voice, data, and video to another communication device (not shown). Accordingly, device 102 can be, but is not limited to, a land mobile radio, a cellular telephone, a personal data assistant (PDA), a personal computer, and the like, with a PTT application. Device 104 can be, but is not limited to, an accessory such as an earpiece or headset, etc., that has a PTT button and that may also be equipped with apparatus for transmitting and receiving media and/or configured for other functionality.

Priority data, as that term is used herein, means data that a sending device selects to send along a faster end-to-end communication path than a communication path used to send non-priority data. Priority data includes, for example, time sensitive data, data whose delivery is of higher importance than non-priority data, and the like. Push-to-talk, as that term is used herein, means a feature implemented on a communication device to enable users to talk on simplex or half-duplex communication paths, wherein during a call only one person at a time is granted the communication resources to speak, while all other parties on the call listen. An example implementation of PTT technology is PTT over cellular (also abbreviated and known in the industry as PoC), wherein the PTT feature is provided over a cellular network. Open Mobile Alliance (OMA), which is a standards body that develops open standards for the mobile phone industry, is defining PoC as part of an IP Multimedia Subsystem, which is an architectural framework for delivering Internet Protocol multimedia services. The most recently released standards for the PoC feature are defined in a group of documents referred to as OMA PoC v 2.0, dated Aug. 6, 2008.

Device 102 comprises: a microcontroller or digital signal processor (DSP) 106; apparatus for short range communications over a short range wireless link 122 (wherein a short range wireless link means a wireless connection that enables two devices to communicate using radio frequency (RF) resources at distances of around 100 m (300 feet) or less, and in one illustrative example between 10-100 m or 30-300') using electromagnetic signals, which in this case is Bluetooth apparatus that includes a Bluetooth integrated circuit (IC) chip 108 with a corresponding antenna 110 that may be internal to the radio or included in an external adapter that is connected to the radio; and a radio core 118 (that includes, for example, a two-way land mobile radio transceiver and a host processor for implementing processes within the radio core) with a corresponding antenna 120 that is activated by a PTT feature to transmit and receive at least voice media over a wireless link 126. Device 104 comprises: a microcontroller or DSP 132; corresponding Bluetooth apparatus that includes a Bluetooth IC chip 128 with a corresponding antenna 130; and other accessory functions 140.

In one embodiment, upon a user powering ON peripheral 104, the devices 102 and 104 perform a pairing procedure to associate peripheral 104 to device 102. Once the radio 102 and the peripheral 104 store their respective numerical credentials for pairing, the devices are "paired", and Bluetooth IC chips 108 and 128 operate to establish a short range Bluetooth wireless link 122 for Bluetooth transmissions such as voice transmissions and other data such as PTT states, state of other buttons and indicators, etc., between the peripheral 104 (e.g., an earpiece or headset) and the radio 102.

The Bluetooth IC chips 108 and 128 both include at least: Bluetooth hardware (e.g., radio frequency hardware core comprising a Bluetooth transceiver and baseband processor); Bluetooth firmware (e.g., that implements lower layers of a multilayer Bluetooth protocol stack that control real-time and on-time management of data formatting and flow needed to sustain the underlying Bluetooth protocol); and a microprocessor that is programmed with software and code stored on memory apparatus on the chip. The Bluetooth hardware, firmware, microprocessor, and/or software and code are communicatively coupled and configured for implementing the Bluetooth protocol in accordance with any one or more of: Bluetooth Specification 1.1 ratified as IEEE Standard 802.15.1-2002; Bluetooth Specification 1.2 ratified as IEEE Standard 802.15.1-2005; Bluetooth Specification 2.0+EDR (Enhanced Data Rate) released on Nov. 10, 2004; Bluetooth Core Specification 2.1 adopted by the Bluetooth SIG on Jul. 26, 2007; Bluetooth Specification 3.0 adopted by the Bluetooth SIG on Apr. 21, 2009; and/or subsequent Bluetooth Specification releases.

The location within the Bluetooth apparatus of upper layers of the Bluetooth stack (that control, for example, user interface applications) depends on whether the Bluetooth apparatus is implemented as an HCI (Host/Controller Interface) system or a non-HCI system. In a non-HCI system, the upper layers of the Bluetooth stack are performed using the resident microprocessor on the Bluetooth chip. Whereas, in an HCI system, the upper layers of the Bluetooth stack are performed using a processing device that is external to the Bluetooth chip; and the upper and lower layers of the Bluetooth stack are coupled via a physical HCI data connection and communicate using a Bluetooth HCI protocol that is defined in the Bluetooth specification.

For example, where the Bluetooth apparatus in peripheral 104 is implemented as a HCI system, the upper layers of the Bluetooth stack are implemented using the microcontroller 132, which is external to the Bluetooth chip 128; whereas in a non-HCI implementation, the upper layers of the stack are implemented within the Bluetooth chip 128. Where the Bluetooth apparatus in radio 102 is implemented as a HCI system, the upper layers of the Bluetooth stack are implemented using the microcontroller 106 or the host processor in the radio core 118, which are both external to the Bluetooth chip 108; whereas in a non-HCI implementation, the upper layers of the stack are implemented within the Bluetooth chip 108. Microcontrollers 106 and 132 may also be used to perform other functionality including, but not limited to, proprietary protocols such as the "nibbler" protocol described in detail below by reference to FIGS. 5-8.

Moreover, the Bluetooth apparatus in devices 102 and 104 may have a "symmetric" architecture or an "asymmetric architecture". A symmetric architecture means that the Bluetooth apparatus of devices 102 and 104 are both implemented as HCI systems or are both implemented as non-HCI systems. An asymmetric architecture means that the Bluetooth apparatus in one device is implemented as an HCI system, and the Bluetooth apparatus of the other device is implemented as a non-HCI system.

In accordance with the teachings herein, priority data is wirelessly communicated between the peripheral 104 and the radio 102 in short range transmissions over a short range wireless link. In a specific embodiment, Bluetooth protocols are used to facilitate transmission of the priority data using the Bluetooth apparatus in devices 102 and 104 as described, for example, by reference to FIGS. 2 to 4. However, in other embodiments other proprietary protocols can be used to transfer the priority data over the Bluetooth link as described, for example, by reference to FIGS. 5 to 8. Moreover, in the described embodiment, Bluetooth technology is used for the short-range communications, but another technology might be used for the short-range communications including, but not limited to, Zigbee, IEEE 802.11 a/b/g (Wi-Fi), Wireless USB, etc. In such a case, the priority data would be transferred in messages created using standard or proprietary protocols for facilitating the implementation of the alternative short range communication technology.

Further, as the term is used herein, a multilayer protocol stack means a plurality of protocols that define a networking architecture for communication devices based on the Open Systems Interconnection (OSI) Reference Model, which divides network architecture into seven layers (i.e., Application, Presentation, Session, Transport, Network, Data-link, and Physical) from top to bottom. Accordingly, the bottom two layers (also termed herein as the lower level or the lower layers) means the Data-link and the Physical layers and the associated protocols implemented to facilitate networking at these layers; and the upper layers (also termed herein as the upper level or the upper layers) means the Application, Presentation, Session, Transport, Network layers and the associated protocols implemented to facilitate networking at these layers.

With further respect to device 102, the transceiver (included in the radio core 118) and antenna 120 are conventional elements that, in this illustrative embodiment, implement one or more protocols that enable the transmission and reception of voice media over the air with other communication devices (not shown). Such protocols may include, but are not limited to, standards specifications for wireless communications developed by standards bodies such as TIA (Telecommunications Industry Association), OMA (Open Mobile Alliance), 3GPP (3rd Generation Partnership Project), 3GPP2 (3rd Generation Partnership Project 2), IEEE (Institute of Electrical and Electronics Engineers) 802, and WiMAX Forum. With further respect to device 104, the other accessory functions 140 may include, but are not limited to functions for, headsets, car audio kits, text display and keyboard devices, handheld computing devices, scanners, printers, and remote control devices.

Figure 2:
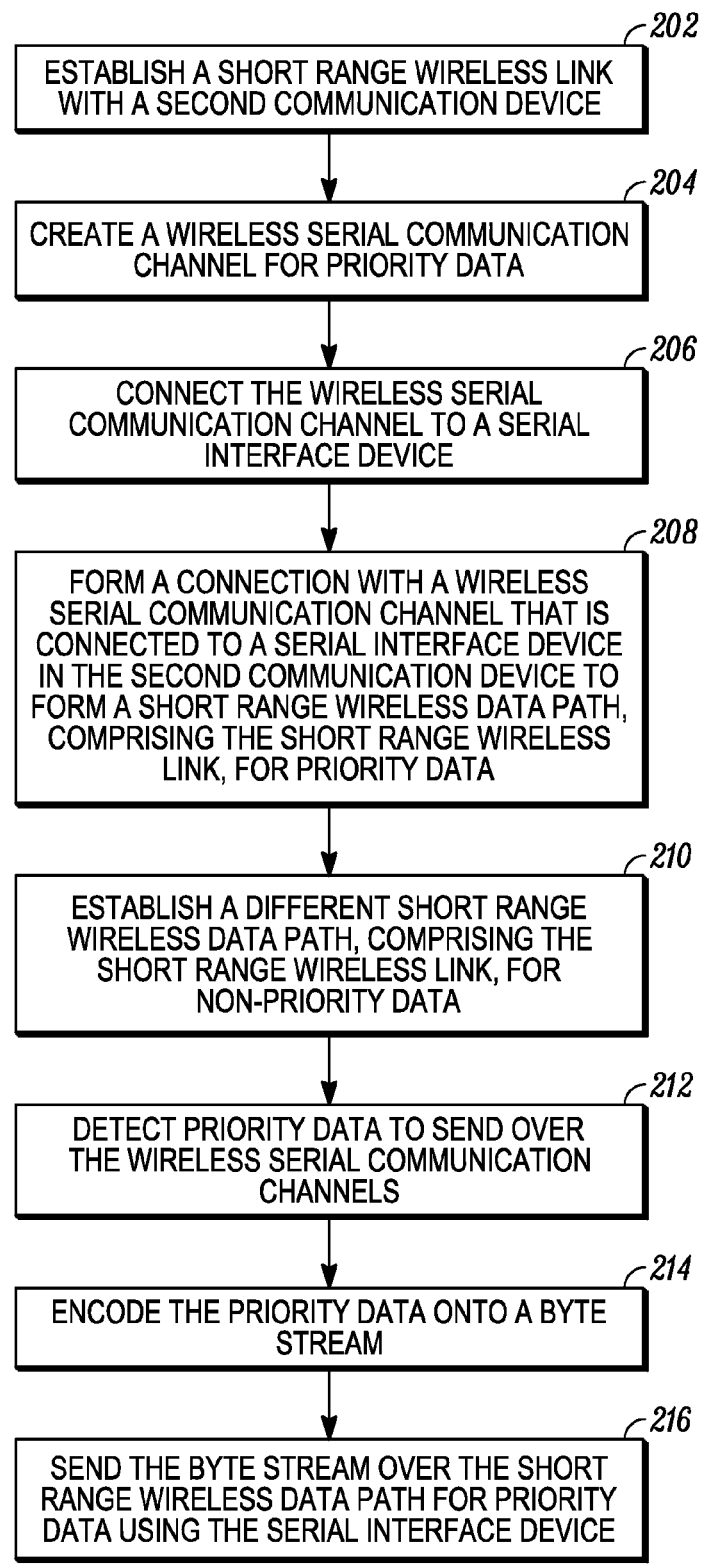
FIG. 2 is a flow diagram of a method for priority signaling over a wireless serial communication channel in accordance with some embodiments.
Figure 3:
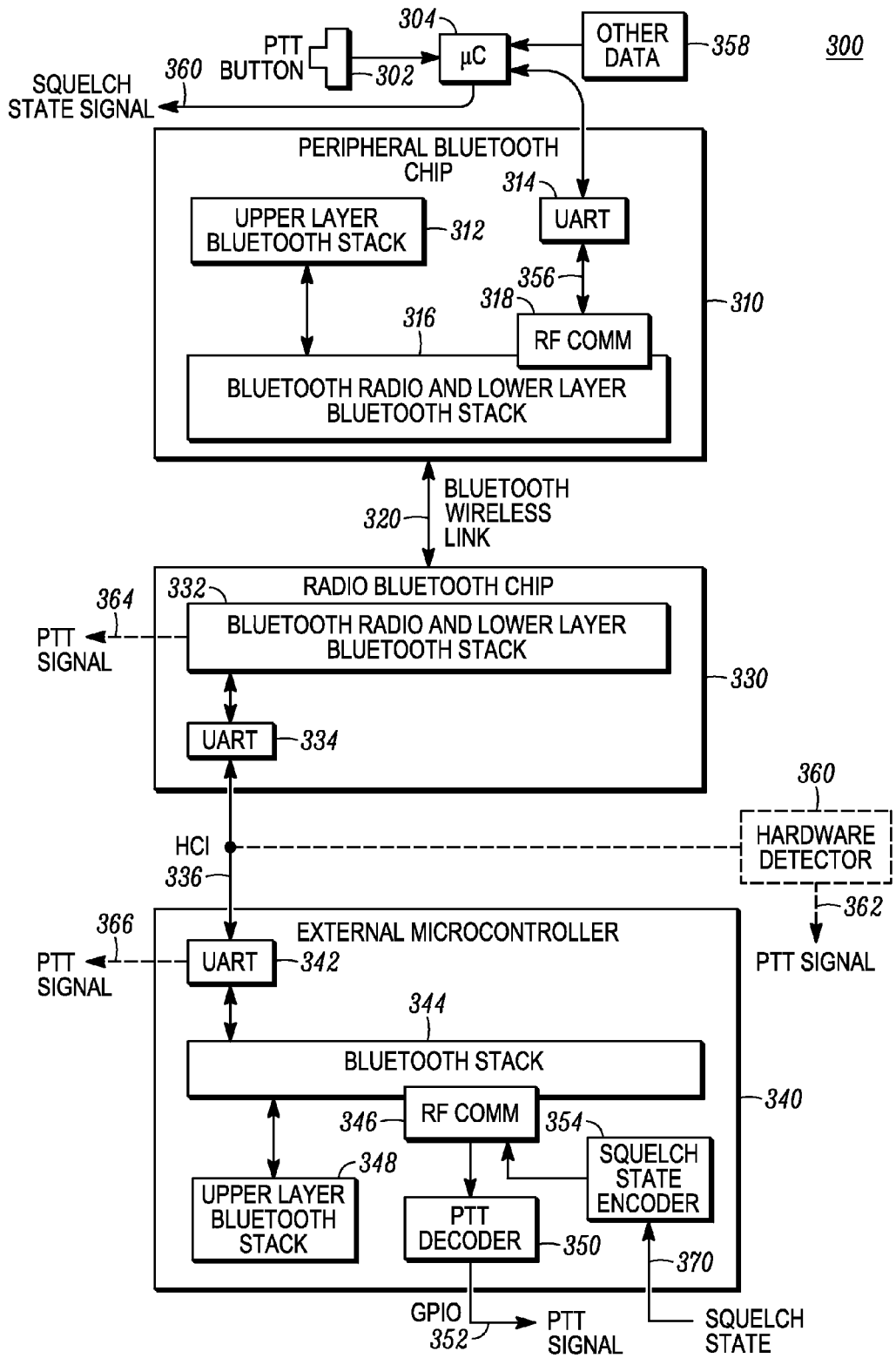
FIG. 3 is a block diagram illustrating encoded priority messages being sent by a Bluetooth subsystem in a peripheral over a wireless serial communication channel and decoded at a Bluetooth subsystem on a radio side in accordance with some embodiments.
Figure 4:
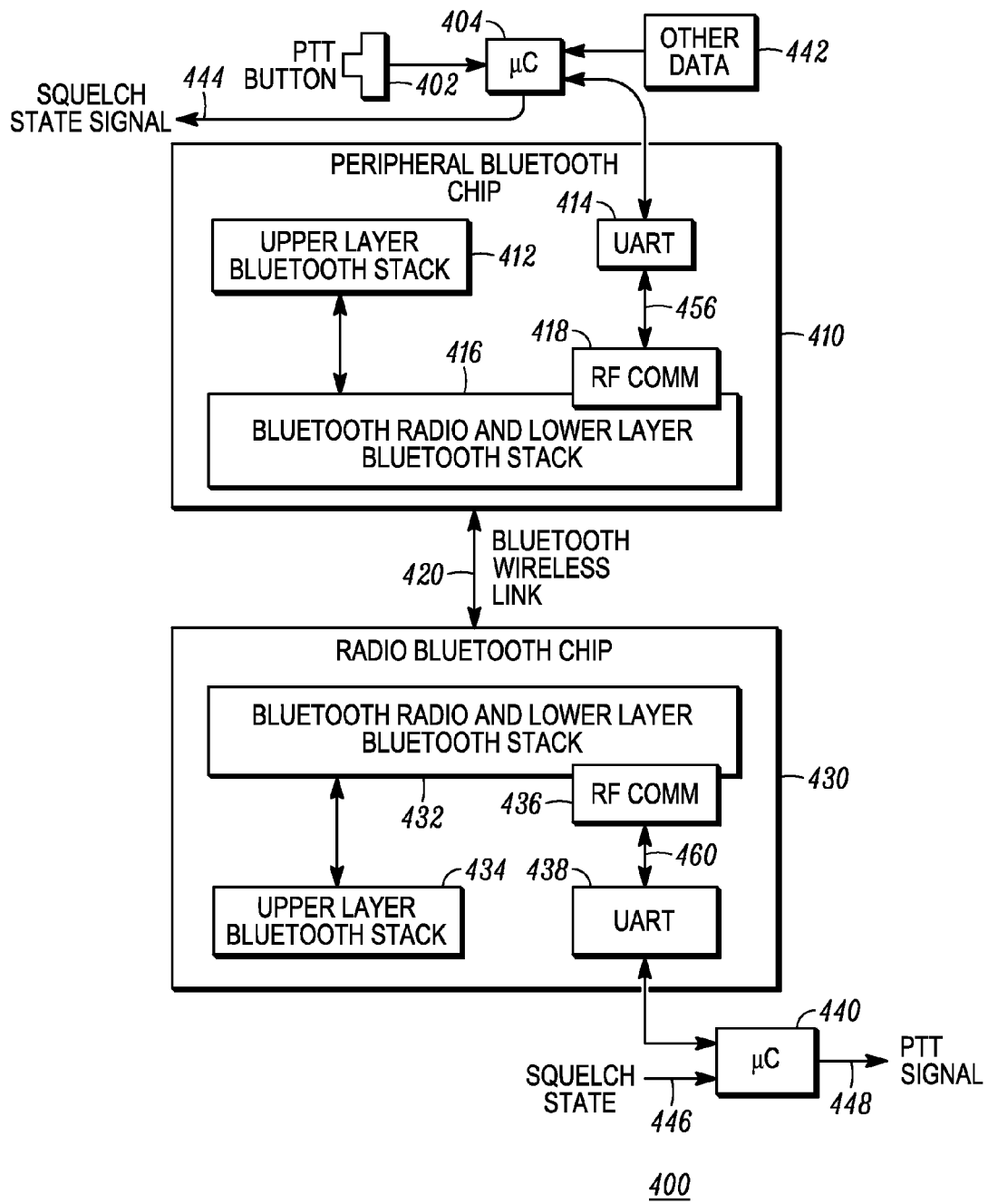
FIG. 4 is a block diagram illustrating encoded priority messages being sent by a Bluetooth subsystem in a peripheral over a wireless serial communication channel and decoded at a Bluetooth subsystem on a radio side in accordance with some embodiments.

Turning now to FIG. 2, there is shown a flow diagram of a method 200 for priority signaling over a wireless serial communication channel in accordance with some embodiments. Method 200 can be performed in the peripheral 104 or the radio 102 for communicating priority data. To facilitate ease of understanding the implementation of method 200, this process will be described by reference to FIGS. 3 and 4, which both show components and corresponding functionality of the Bluetooth apparatus in a peripheral and radio. In FIG. 3, the Bluetooth apparatus in the radio and the peripheral have an asymmetric architecture. In FIG. 4, the Bluetooth apparatus in the radio and the peripheral have a symmetric architecture. It is further noted that, with respect to the description herein, all blocks implemented by a processing device represent modules that are implemented by the processing device being programmed with relevant code (software and/or firmware).

Apparatus 300 illustrated in FIG. 3 comprises: a PTT button 302 (that indicates a state of PTT PRESS when a user presses a button, and PTT RELEASE, upon a user releasing the button) coupled to a peripheral Bluetooth chip 310 via an external microcontroller 304; a radio Bluetooth chip 330 communicatively coupled to the peripheral Bluetooth chip 310 via a Bluetooth wireless link 320; an external microcontroller 340 (which can comprise the host processor in the radio core or another microcontroller external to both the Bluetooth chip 330 and the host controller) communicatively coupled to the radio Bluetooth chip 330 via a HCI 336; and optionally a hardware detector 360 coupled to the HCI 336.

The peripheral Bluetooth chip 310 comprises: an upper layer Bluetooth stack 312 that includes applications that interface with the user to communicate media such as user voice data; a serial interface device 314, that in this case is an on-chip Universal Asynchronous Receiver/Transmitter (UART) but that can be any such device including but not limited to a RS-232C device, a SDIO (Secure Digital Input/Output), a USB (Universal Serial Bus), and the like, which is a physical hardware interface that converts outgoing bytes of data from the microcontroller 304 into a serial bit stream and converts incoming bits of data into bytes of data for providing to the microcontroller 304; and a Bluetooth radio and lower layer Bluetooth stack 316 that handles the modulation of data for transport over the Bluetooth wireless link 320 and the demodulation of data received from the Bluetooth wireless link 320. The radio Bluetooth chip 330 comprises a corresponding Bluetooth radio and lower layer Bluetooth stack 332 and a UART 334. The external microcontroller 340 comprises: a UART 342; a part of the Bluetooth stack 344 (also referred to herein as the middle layer Bluetooth stack) that handles at least Bluetooth radio frequency communication (RFCOMM) protocol messages and may also execute other Transport and/or Network layer protocols; an upper layer Bluetooth stack 348 that includes at least the Application layer; a PTT decoder 350, and a squelch state encoder 370.

Apparatus 400 in FIG. 4 comprises: a PTT button 402 coupled to a peripheral Bluetooth chip 410 via an external microcontroller 404; a radio Bluetooth chip 430 communicatively coupled to the peripheral Bluetooth chip 410 via a Bluetooth wireless link 420; and an external microcontroller 440 communicatively coupled to the radio Bluetooth chip 430. The peripheral Bluetooth chip 410 comprises: an upper layer Bluetooth stack 412; a UART 414; and a Bluetooth radio and lower layer Bluetooth stack 416. The radio Bluetooth chip 430 comprises a corresponding Bluetooth radio and lower layer Bluetooth stack 432, an upper layer Bluetooth stack 434, and a UART 438.

We now turn back to FIG. 2 and the operation of apparatus 300 and 400 in accordance with the teachings herein to communicate priority data between two wireless communication devices (e.g., a peripheral and a radio). In the prior art, a problem that contributes to the latency in signaling time-sensitive events, such as PTT states and squelch states, is that the path of this data includes the upper layer Bluetooth stack 312, 412, especially the application layer, which adds processing time to the signaling. However, in accordance with the teachings herein, a second autonomous path is created that either does not require priority data to be processed in the upper layer Bluetooth stack at all or substantially minimizes such processing, thereby minimizing the latency for signaling of time-sensitive events.

To get this fast event signaling for time-sensitive events, during startup of the peripheral device and connection to the master Bluetooth apparatus to form (202) the short range Bluetooth wireless link 320, 420, the Application layer of the upper level stack 312, 412 in the peripheral creates (204) a short range wireless data path that bypasses of the upper layer Bluetooth stack 312, 412 and that includes a wireless serial communication channel. A short range wireless path means a reliable data path that is established using one or more wireless protocols and that includes a short range wireless link.

In this illustrative Bluetooth implementation, the upper layer Bluetooth stack 312, 412 uses the Bluetooth RFCOMM protocol (part of the Bluetooth protocol suite) to establish a RFCOMM wireless serial communication data channel 318, 418 that is operated by the lower level Bluetooth stack 316, 416 and that provides a simple reliable data stream that emulates a serial port connecting to a remote Bluetooth device (a radio adaptor or Bluetooth apparatus internal to the radio) via a RFCOMM channel 346, 436 created by the Application layer in the upper layer Bluetooth stack 348, 434 in the radio Bluetooth apparatus. In the symmetric case, the RFCOMM channel 436 is operated by the lower layer Bluetooth stack 432 in the radio Bluetooth chip 430. In the asymmetric case, the RFCOMM channel 346 is operated by the portion 344 of the upper layer Bluetooth stack (also termed the middle layer Bluetooth stack) that includes the implementation of the RFCOMM protocol (and perhaps one or more other transport and network layer protocols) but that excludes the implementation of Application layer protocols, which are implemented the upper layer Bluetooth stack 348 that handles the user interface applications.

The Application layer of the upper layer stack 312, 412 then causes an autonomous stream connection 356, 456 to be formed (206) from the on-chip UART 314, 414 to the newly created RFCOMM channel 318, 418. This UART to RFCOMM channel data path 356, 456 is a bi-directional "autonomous" stream connection (that bypasses the path through the upper layer Bluetooth stack 312, 412), which means that whatever data that comes into the UART 314, 414 is communicated across the path 356, 456 to the RFCOMM 318, 418 (and vice-versa) without any intervention from any of the upper layer Bluetooth stack and Application layers 312, 412. Similarly, in the symmetric architecture (system 400), the Application layer in the upper layer Bluetooth stack 434 connects its newly formed RFCOMM channel 436 to its UART 438 via a similar autonomous stream connection to form an autonomous bi-directional stream connection 460.

Moreover, the upper layer Bluetooth stack 412 associates (208) the RFCOMM channel 418 created in the peripheral to the RFCOMM channel 436 created on the radio side upon learning (using Bluetooth signaling during the initial power-up of the peripheral and connection to the radio Bluetooth apparatus) a channel number that identifies the RFCOMM channel 436. This connects the autonomous stream connections 456, 460 from the peripheral perspective to form the complete autonomous short range wireless data path for exchanging priority data. Similarly, in the symmetric architecture, the upper layer Bluetooth stack 434 associates the RFCMM channel 438 to the RFCOMM channel 418 upon learning (during the Bluetooth signaling during initial power-up of the peripheral and connection to the radio Bluetooth apparatus) the channel number that identifies the RFCOMM channel 418. This connects the autonomous stream connections 460, 456 from the radio side perspective to form the complete autonomous short range wireless data path for exchanging priority data.

As mentioned above, once these UART to RFCOMM connections have been formed, data entering one UART emerges from the other without any intervention of the upper level stack control layers 312, 412, 434. At the radio side, the data that emerges from the UART 438 is interpreted (decoded) by the external microcontroller 440 as a PTT signal 448 that is used to set an event in the radio core to communicate the determined PTT state. For example, the PTT signal 448 sets a GPIO (General Purpose Input/Output) on the radio or sends a message to another subsystem in the radio by a second data pipe such as a secondary serial interface. Accordingly, the entire UART to UART connection in system 400 is handled entirely by the low-level Bluetooth stack 416, 432, and because of this, the incremental signaling latency is very low. In this symmetric case, the incremental latency between a byte entering one UART and the byte exiting the UART in the opposing RFCOMM connected system has been observed to be less than 50 ms on average.

In the asymmetric case (system 300), the upper layer Bluetooth stack 312 associates (208) the RFCOMM channel 318 created in the peripheral to the RFCOMM channel 346 created on the radio side upon learning a channel number that identifies the RFCOMM channel 346 to form, from the peripheral perspective, the complete autonomous short range wireless data path for exchanging priority data. Similarly, the upper layer Bluetooth stack 348 associates the RFCOMM channel 346 to the RFCOMM channel 318 to form, from the radio side perspective, the complete autonomous short range wireless data path for exchanging priority data. At the radio side, the RFCOMM byte stream from the short range data path comprising the RFCOMM channels 318, 346 is directed into an internal software sink 350 in the external microcontroller 340 that decodes the PTT state priority data and delivers a corresponding PTT signal 352 to the radio core. The latency observed in the asymmetric case is still very low (since the primary cause of the prior art latency, which was the latency resulting from processing in the upper layer Bluetooth stack in the peripheral, is eliminated) and has been observed to be less than 50 ms.

Again, the short range wireless data path established for communicating priority data operates autonomously from a wireless data path established (210), by conventional Bluetooth signaling, through the upper layer Bluetooth stacks 312, 348 and 412, 434 for transporting non-priority data signaling for user interface applications that carry, for example, user input media such as voice. The data path for the non-priority data is also termed in the art as a SCO (synchronous connected oriented) data connection.

Moreover, as indicated above, the RFCOMM to RFCOMM path is bidirectional, with the same performance in each direction. The uplink path (radio side to peripheral) can be used for time-sensitive high priority event signaling to the peripheral. An example of a high priority uplink event is "radio has unsquelched". This signal can be used to control an audio power amplifier (PA) in a headset (for instance) in a rapid way such that the beginning of speech messages are not missed, which means that the peripheral amplifier can be turned on within 50 ms (on average) of the radio activating an external audio PA or the radio core indicating to the wireless Bluetooth apparatus that there is active incoming audio.

In system 300, a squelch state encoder 354 implemented in the external microcontroller 340 receives from the radio and encodes a squelch state 370 which it sends via the autonomous RFCOMM 346 to RFCOMM 318 path for decoding in the microcontroller 304, which provides a squelch state signal 360 containing the squelch state data to the peripheral via a GPIO or other secondary serial connection. In system 400, microprocessor 440 receives from the radio and encodes a squelch state 446 which it sends via the autonomous RFCOMM 436 to RFCOMM 418 path for decoding in the microcontroller 404, which provides a squelch state signal 444 containing the squelch state data to the peripheral.

Turning back to method 200 of FIG. 2, once the autonomous wireless data paths comprising the wireless serial communication channels (e.g., the RFCOMM to RFCOMM paths) are established, priority data is detected (212) for sending over these channels, encoded (214) onto a byte stream, and sent (216) over the novel short range wireless data path created for the priority data to another wirelessly connected device. In an embodiment, the priority data (such as PTT state and squelch state) is encoded into each data segment in a plurality of data segments provided by the serial interface device (e.g., the UART), wherein each data segment has a selected byte size that depends on the particular serial interface device implementation. In the UART embodiment, the selected byte size is one byte. Accordingly, in the UART embodiment, the priority data is encoded into each byte of the data stream provided to the UART. For example, each byte of data may be encoded via setting a set of bits (e.g., one or more bits) in each byte to indicate the priority data.

Generally, the priority data (e.g., time-sensitive high priority data) can be sent using less than the entire byte of data. Therefore, to more efficiently use the novel autonomous short range wireless data path, the priority data is encoded with other data 358, 442, respectively, in the microcontrollers 304, 404. The other data (which is also termed "priority data" since it is being sent over the autonomous RFCOMM to RFCOMM path) includes, but is not limited to, a state of a button, a state of an indicator (such as an LED), a state of a battery, a state of audio. In a general sense, the microcontrollers 304, 404 may be programmed with code to perform a novel process of encoding comprising: receiving a first data stream generated from a button, indicator, etc. on the peripheral, wherein the first data stream has a first size; generating a second data stream to send (to the serial interface device) that has a second size that is larger than the first size by dividing the first data stream into a number of data segments having a selected byte size (e.g., one byte in length); encoding the priority data into data segments; and sending the data segments with the encoded priority data to the other device.

In accordance with this novel encoding protocol, any number of packing schemes can be used whereby an original eight bit data stream (of other data 358, 442) is encoded into multiple data segments each having less than all of the bits of the original eight bit data stream. In one embodiment, one byte of a data stream of other data 358, 442 is divided into two four bit streams or two "nibbles" (thus, the novel protocol is termed a "nibbler" protocol, which as the term is used herein refers to the packing using two nibbles and to any other packing scheme) each encoded into a two-byte pair, with the time-sensitive priority data (e.g., PTT state) being encoded into "extra/reserved" of each byte of the two-byte pair. In such a case, the nibbler data stream is about twice as long as the original data stream. To ensure that the PTT press has priority over all other messages, the protocol reserves one bit, e.g., the upper bit, of all bytes to indicate the state of the PTT. Moreover, a null message is used to indicate the state of the PTT if there is no other data to send. There is also a bit to indicate a HEADER so that the stream can indicate length and SYNC of the nibbles. Alternative to the length fields is just to use the header bit to indicate odd and even nibbles. The radio side runs a protocol to determine PTT state from the nibble stream sent over the RFCOMM channels. Then the microcontroller 340, 440 takes the bottom two nibbles of the incoming bytes and puts them back together again to form a single byte that is sent to the appropriate application on the radio.

FIG. 5 to FIG. 8 illustrate tables to facilitate an example implementation of the nibbler protocol. More particularly, FIG. 5 to FIG. 8, respectively, provide an illustrative implementation of the nibbler protocol format, example headset protocol states, an example null message, and example messages with buttons and battery states. With respect to FIG. 5, illustrative ranges for the fields comprise: PTT state=1 bit, with a range 0, 1; Byte type=1 bit, with a range of 0, 1; length=LEN 1*8+LEN2=8 bits, with a range of 1-255 (0 is null message); and data=D1*8+D2=8 bits, with a range of 0-255. It should be realized, however, that this is just one illustrative implementation of the nibbler protocol. Alternative implementations may by used. In one example, for instance, PTT state and the states of multiple (two or more, up to seven) other buttons and indicators can be encoded onto each data segment (e.g., each one byte of data) using the nibbler protocol.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for priority data signaling described herein. The non-processor circuits may include, but are not limited to, a radio receiver, a radio transmitter, signal drivers, clock circuits, power source circuits, and user input devices. As such, these functions may be interpreted as steps of a method to perform priority data signaling described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for priority signaling over a wireless serial communication channel, the method comprising:
   at a first communication device:
   establishing a first short range wireless data path to a second communication device for exchanging non-priority data;
   establishing a second short range wireless data path to the second communication device, which is different than the first short range wireless data path, for exchanging priority data encoded into a byte stream, wherein the second short range wireless data path comprises a wireless serial communication channel, further wherein the priority data comprises a one-bit indication of a push-to-talk (PTT) state encoded into the byte stream,
   wherein the first and second short range wireless data paths are both established by upper layer of a protocol stack, in the first communication device, that includes an application layer, and
   further wherein the established second short range wireless data path bypasses the upper layer of the protocol stack, that includes the application layer when the priority data is sent from the first communication device to the second communication device to reduce the latency of the sending the priority data on the second short range wireless data path compared to the latency of sending the priority data on the first short range wireless data path.

2. The method of claim 1, wherein the first and second short range wireless data paths comprises a Bluetooth wireless link.

3. The method of claim 2, wherein the wireless serial communication channel is established using Bluetooth radio frequency communication (RFCOMM) protocol.

4. The method of claim 3, wherein establishing the second short range wireless data path comprises:
   creating a first RFCOMM channel;
   forming a connection with a second RFCOMM channel created in the second communication device.

5. The method of claim 4, wherein establishing the second short range wireless data path further comprises:
   connecting the first RFCOMM channel to a serial interface device in the first communication device, wherein the second RFCOMM channel is connected to a serial interface device in the second communication device.

6. The method of claim 1, further comprising:
   detecting priority data for sending over the second short range wireless data path;
   encoding the priority data into a byte stream; and
   sending the byte stream over the wireless serial communication channel using a serial interface device.

7. The method of claim 6, wherein the priority data comprises a push-to-talk (PTT) state that is encoded into the byte stream.

8. The method of claim 7, wherein the priority data further comprises other data that is encoded with the PTT state into the byte stream.

9. The method of claim 8, wherein encoding the other data with the PTT state comprises encoding each byte of the other data into a two byte pair of the byte stream, and encoding the PTT state into each byte of the two byte pair.

10. The method of claim 7, wherein encoding the PTT state into the byte stream comprises encoding the PTT state into a null message when there is no other data to send over the wireless serial communication channel.

11. The method of claim 6, wherein the priority data comprises a squelch state.

12. The method of claim 6, wherein the priority data comprises push-to-talk (PTT) state and other data, and encoding the priority data into a byte stream comprises using a nibbler protocol, wherein the nibbler protocol comprises:
   dividing each byte of the other data into two four-bit nibbles;
   encoding, into each byte of a two-byte pair, the PTT state and one of the four bit nibbles.

13. The method of claim 1, wherein the priority data comprises at least one of: a state of a button; a state of an indicator; a state of a battery; and a state of audio.

14. The method of claim 1, wherein the wireless serial communication channel is bidirectional.

15. The method of claim 1, wherein:
in sending the non-priority data, the established first short range wireless data path comprises the upper layer of the protocol stack that includes the application layer.

16. Apparatus for priority signaling over a wireless serial communication channel, the apparatus comprising:
a Bluetooth radio for communicating data over a Bluetooth wireless link to a second Bluetooth apparatus;
a lower layer Bluetooth stack coupled to the Bluetooth radio; an upper layer Bluetooth stack coupled to the Bluetooth radio and to the lower layer Bluetooth stack, wherein the upper layer Bluetooth stack includes an application layer that:
establishes a first short range wireless data path to the second Bluetooth apparatus for exchanging non-priority data, wherein the first short range wireless data path comprises the upper layer Bluetooth stack;
establishes a second short range wireless data path to the second Bluetooth apparatus for exchanging priority data encoded into a byte stream, wherein the second short range wireless data path comprises a wireless serial communication channel operated by the lower layer Bluetooth stack, and wherein the second short range wireless data path bypasses the upper layer Bluetooth stack that includes the application layer when the priority data is sent to the second Bluetooth apparatus, to reduce the latency of the sending the priority data on the second short range wireless data path compared to the latency of sending the priority data on the first short range wireless data path;
further wherein the priority data comprises a one-bit indication of a push-to-talk (PTT) state encoded into the byte stream.

17. The apparatus of claim 16, further comprising a serial interface device, wherein:
the wireless serial communication channel comprises a Bluetooth radio frequency communication (RFCOMM) channel created by the upper layer Bluetooth stack to have an autonomous stream connection to the serial interface device.

18. The apparatus of claim 17, wherein the serial interface device comprises a Universal Asynchronous Receiver/Transmitter.

19. The apparatus of claim 16, wherein the Bluetooth radio, lower layer Bluetooth stack, upper layer Bluetooth stack, and second Bluetooth apparatus have: a symmetric architecture; or an asymmetric architecture.

20. The apparatus of claim 16, wherein the Bluetooth radio, lower layer Bluetooth stack, upper layer Bluetooth stack, and second Bluetooth apparatus have an asymmetric architecture.

21. The method of claim 1, wherein bypassing the upper layer of the protocol stack, including the application layer, on the second short range wireless data path enables the latency of the second short range wireless data path to be lower than latency of the first short range wireless data path.

22. The apparatus of claim 16, wherein bypassing the upper layer of the protocol stack, including the application layer, on the second short range wireless data path enables the latency of the second short range wireless data path to be lower than latency of the first short range wireless data path.

23. The apparatus of claim 16, wherein the priority data comprises push-to-talk (PTT) state and other data, and encoding the priority data into a byte stream comprises using a nibbler protocol, wherein the nibbler protocol comprises:
dividing each byte of the other data into two four-bit nibbles;
encoding, into each byte of a two-byte pair, the PTT state and one of the four bit nibbles.

* * * * *